United States Patent
Freeman

[11] 3,818,813
[45] June 25, 1974

[54] ATMOSPHERE CIRCULATION SYSTEM
[75] Inventor: Carl R. Freeman, Hinsdale, Ill.
[73] Assignee: Julian Engineering, Chicago, Ill.
[22] Filed: Jan. 5, 1973
[21] Appl. No.: 321,136

[52] U.S. Cl. ................. 98/33 A, 34/231, 416/124
[51] Int. Cl. ............................................ F24f 13/08
[58] Field of Search ...... 34/231; 98/33 A, 111, 113, 98/94 AC; 416/124

[56] References Cited
UNITED STATES PATENTS

| | | | |
|---|---|---|---|
| 1,185,267 | 5/1916 | Vuilleumier | 416/124 |
| 1,244,480 | 10/1917 | Dieterich | 416/124 |
| 2,300,574 | 11/1942 | Jepertinger | 98/111 X |
| 2,489,820 | 11/1949 | Russell et al. | 34/231 X |
| 2,738,127 | 3/1956 | Howard | 98/111 |

Primary Examiner—William E. Wayner
Attorney, Agent, or Firm—Lee & Smith

[57] ABSTRACT

An apparatus and method are disclosed for the circulation of an atmosphere within an enclosed chamber such as a smokehouse. The apparatus comprises a fan and a movable deflector located in the path of atmosphere stream from the fan. The deflector has adjustable louvres which may be locked in the desired position for angularly deflecting the atmosphere from the fan, and the deflector is connected to a power source such that the deflector may be continually moved to deflect and direct the atmosphere flow toward different areas of the chamber. In accordance with the method, the deflector is rotated in the stream of atmosphere from the fan with the speed of rotation being substantially slower for the deflector than for the fan blade.

3 Claims, 4 Drawing Figures

PATENTED JUN 25 1974 3,818,813

PATENTED JUN 25 1974　　　　　　　　　　3,818,813

ATMOSPHERE CIRCULATION SYSTEM

BACKGROUND OF THE INVENTION

This invention relates to an atmosphere circulation device for a chamber. The chamber may be a smokehouse, a greenroom or even a cooling chamber such as a freezer or refrigerator. The invention has particular application to and will be described herein in connection with a smokehouse, but it will be understood that it will also have application to various other types of chambers in which it is desirable to rapidly circulate the atmosphere.

In a smokehouse of the type in which meat products such as sausages, hams, bacon and the like are treated, it is desirable to have an efficient circulation of the smoke atmosphere so that the product undergoing treatment will be uniformly smoked. One way in which the atmosphere within the smokehouse may be circulated is by means of external blowers and fixed ducts which introduce the atmosphere into the chamber and withdraw it from the chamber. Exemplary of this type of circulation system is that disclosed in U.S. Pat. No. 2,505,973. In such systems, however, the circulation of the atmosphere within the chamber is dependent upon the force with which the atmosphere is introduced through the inlet ducts and the force of the suction at the outlet or return ducts. With circulation through fixed inlets and outlets the flow within the chamber tends to become channelized along paths of least resistance, and unless care is exercised in loading the chamber, it is possible that the product within the chamber may not be uniformly treated.

More recent developments in this art are disclosed in copending U.S. Pat. application Ser. No. 263,152 wherein fans for circulating the atmosphere within the chamber are mounted on carriages which are reciprocally movable along tracks adjacent the walls or ceiling of the chamber. The constantly changing position of the fans results in constantly changing flow paths for a more uniform circulation of the atmosphere within the chamber. In a smokehouse, however, the fan motors must be protected from the deleterious effects of the smoke atmosphere. One way of accomplishing this is to mount the motor within a separate specially constructed tubular construction adjacent the chamber, with the shaft of the motor extending into the chamber through a curtained longitudinal slot and with the fan blade being mounted on the shaft within the chamber. A positive pressure of fresh air within the tubular construction prevents the smoke from contacting the fan motor. With this arrangement a conventional electric motor may be utilized to drive the fan.

Another way of protecting the fan motor from the smoke is to use a completely enclosed hydraulic motor. This permits the motor to be disposed within the smokehouse, but requires additional equipment such as hydraulic pumps and lines.

The present invention is an improvement which permits the fan motors to be mounted outside the chamber and which accomplishes the constant change in the paths of flow of atmosphere within the chamber without moving the fan motor or motors relative to the chamber. With this system conventional equipment is utilized, there are fewer moving parts within the chamber and servicing is facilitated.

SUMMARY OF THE INVENTION

The present invention is an improvement in an atmosphere circulation apparatus for a chamber such as a smokehouse where food products, such as meat, are treated with a heated, smoke-laden atmosphere.

In one form the apparatus includes blower means for forcibly flowing a stream of atmosphere within the chamber in a predetermined direction, deflector means mounted in front of the blower means to angularly deflect at least a portion of the atmosphere stream from the predetermined direction, and power operated means for continually moving the deflector means relative to the blower means, whereby the stream of atmosphere may be deflected and directed toward different areas of the chamber.

The blower means is preferably a rotating fan blade disposed within the chamber, on a fan shaft which extends through a bearing member in the chamber wall. The deflector means is preferably rotatably mounted and carries louvres which are adjustable so that the angle of deflection may be adjusted. The louvres may be disposed in radial array.

The deflector means and fan shaft are driven by a motor or motors which may be disposed outside of the chamber and thus protected from the atmosphere within the chamber.

DETAILED DESCRIPTION OF THE PREFERRED EMBODIMENT

Figure 2:
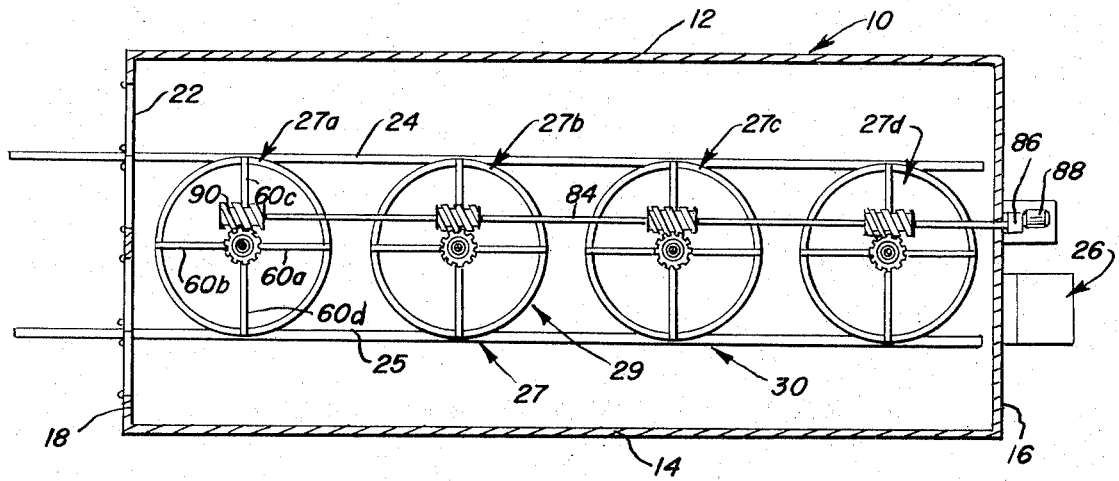
FIG. 2 is a top sectional view of the smokehouse taken substantially along 2—2 of FIG. 1 and showing the fan blades, the deflectors and the drive mechanism for effecting rotating movement of the deflectors relative to the fans.
Figure 1:
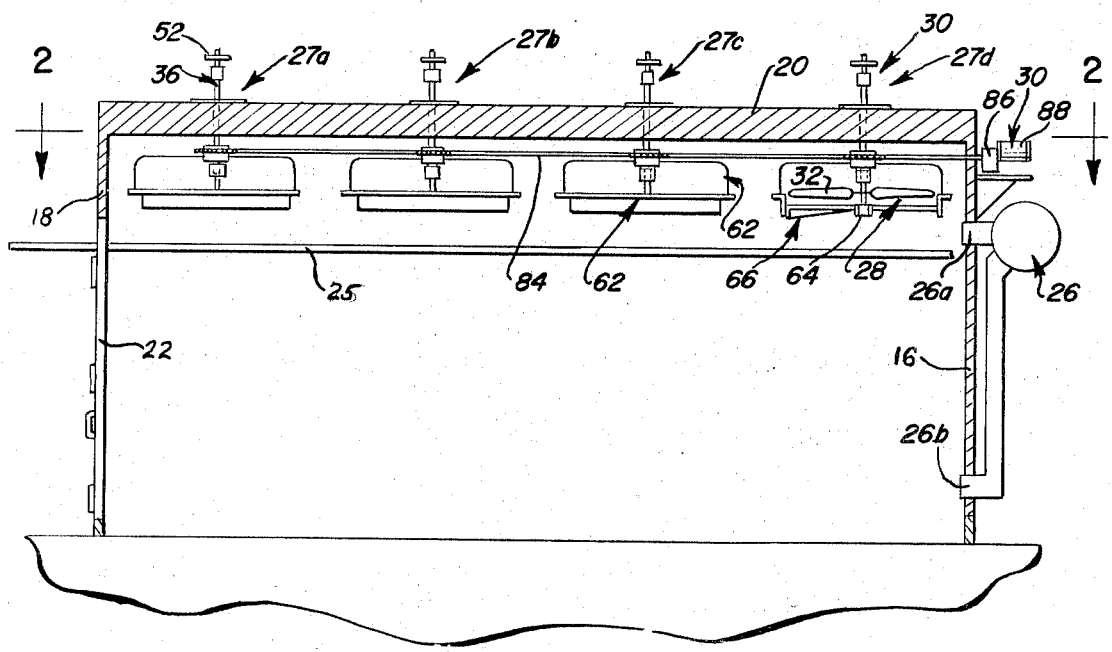
FIG. 1 is a side elevational view of a smokehouse showing installed therein atmosphere circulation apparatus constructed in accordance with one embodiment of this invention.

With further reference to the drawings and particularly to FIGS. 1 and 2, there is illustrated a smokehouse 10 having side walls 12 and 14, an end wall 16, a front wall 18 and a ceiling 20. In the front wall are a plurality of hinged doors 22, giving access to the interior of the smokehouse. The product to be smoked may be loaded onto suitable racks or supports (not shown) and these may be suspended from the rails 24 and 25. Also schematically illustrated in FIGS. 1 and 2 is the heating and smoke generating unit 26 which is of standard and well-known construction and conducts the heated, smoke-laden atmosphere into the smokehouse or chamber 10 through an inlet 26a and exhausts it through an outlet 26b. A humidifying apparatus (not shown) is usually also employed in order to maintain the humidity within the smokehouse at a desired level.

The apparatus 27 is employed to provide a uniform circulation of the atmosphere within the smokehouse. In the illustrated embodiment, the apparatus includes four aligned circulation units 27a, 27b, 27c and 27d which are identically constructed and operated. It will be appreciated that the number of units and the alignment of the units will be governed by the size and shape of the interior of the smokehouse. In some smokehouses it is possible that one or two circulation units will be sufficient; whereas, in many other smokehouses there will be a requirement for more than four units and it may be advisable to stagger the units rather than to place them in alignment as shown in the illustrated embodiment.

Figure 3:
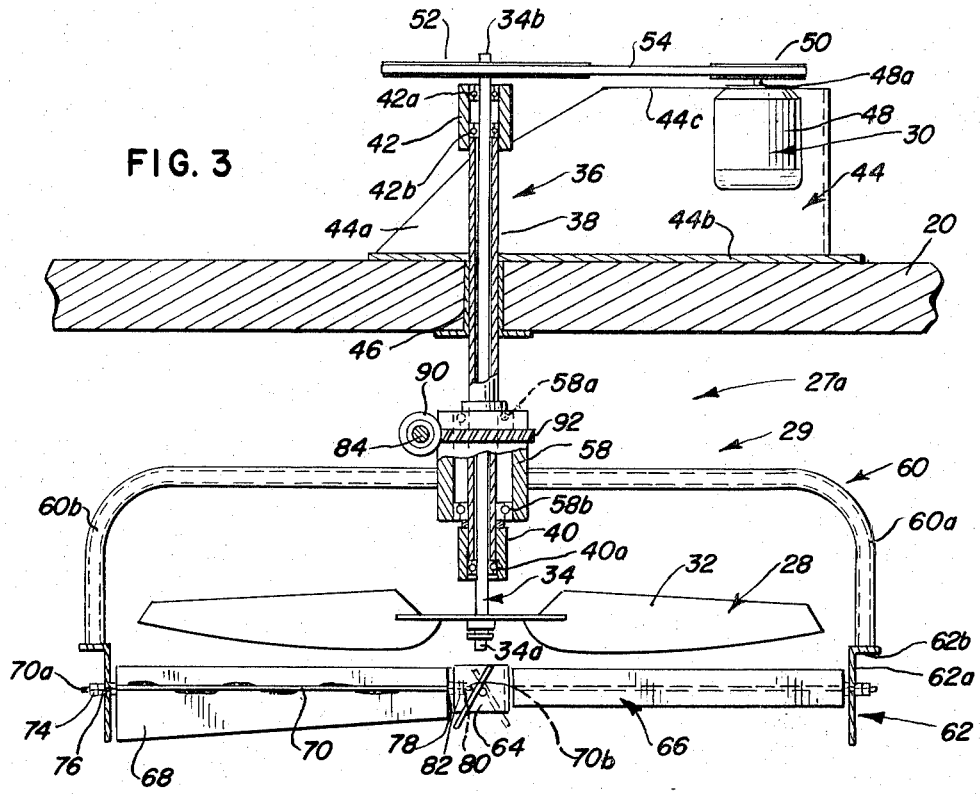
FIG. 3 is an enlarged side elevational view partially in section of one of the atmosphere circulation devices.

In FIG. 3 there is shown the details of one of the air circulation units 27a. The unit has a blower means in the form of a fan 28, a deflector means in the form of a louvred deflector assembly 29 and power means in the form of one or more motor drive mechanisms 30 for operating the blower means and continually moving the deflector means so that the atmosphere may be deflected and directed toward different areas of the chamber 10.

In the illustrated embodiment the blower means or fan 28 comprises a fan blade 32 which is disposed within the smokehouse 10 and is affixed to the lower end 34a of an elongated fan shaft 34. The fan shaft 34 extends upwardly through a tubular bearing member 36 mounted in the roof and ceiling 20 of the smokehouse 10, with the upper end 34b of the fan shaft extending through the upper end of the bearing member 36. The bearing member 36 includes an elongated tubular shank 38, a lower bearing element 40 and an upper bearing element 42. The lower bearing element 40 has ball bearings 40a and the upper bearing element has ball bearings 42a and 42b.

The upper end of the shank portion 38 of the bearing member 36 is welded or otherwise affixed to an upstanding flange portion 44a of a mounting bracket 44. This mounting bracket has a horizontal lower flange portion 44b which may rest upon and is attached to the roof and ceiling 20 of the smokehouse so that the bearing member 36 will be rigidly held in position with respect to the smokehouse ceiling 20. The bearing member 36 extends downwardly through an aperture in the roof and ceiling 20, and a resilient seal 46 surrounds the shank 38 to seal the bearing member to the ceiling so that there is no leakage of atmosphere around the bearing member. The upper end 34b of the fan shaft 34 extends above the upper bearing element 42 of the bearing 36 and above the ceiling of the smokehouse out of the atmosphere of the smokehouse.

The power operated means for driving the fan 28 is also illustrated in FIG. 3 and includes a motor 48 having a drive shaft 48a on which is mounted a belt drive pulley 50. A belt-driven pulley wheel 52 is affixed to the upper end 34b of the fan shaft 34, and a drive belt 54 extends around the drive pulley 50 and driven pulley wheel 52. The motor 48 is mounted on the mounting bracket 44 and preferably on the upper horizontal flange 44c of that mounting bracket. Thus, both the motor 48 and the upper end of the fan shaft 34 are disposed outside of the smokehouse 10 while the rotating fan blade 32 is disposed within the smokehouse.

Figure 4:
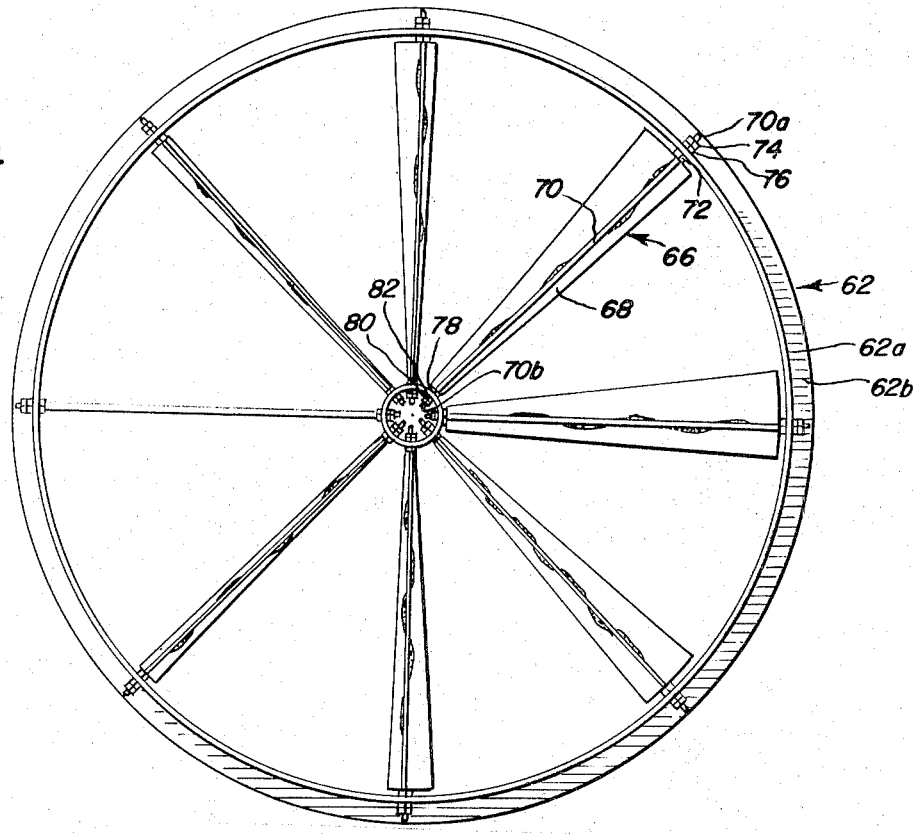
FIG. 4 is a bottom plan of the device of FIG. 3 showing the deflector and the adjustable louvres thereof.

Also disposed within the smokehouse is the deflector means or louvred deflector assembly 29. This deflector assembly comprises a sleeve-like central support member 58 which is journaled for rotation on the stationary shank portion 38 of the bearing member 36 just above the lower bearing cap member 40. A support member 58 carries bearings 58a and 58b which permit the member to be freely rotated with respect to the bearing member shank portion 38. Extending outwardly and downwardly from the support member 58 is a spider-like frame 60 consisting of four arms 60a, 60b, 60c and 60d (See FIG. 2). These arms extend radially outwardly from the support member 58, and at a radius which is somewhat larger than the radius of the fan blade 32 these arms are bent downwardly. Affixed to the downwardly extending outer ends of the arms 60a-d is a ring member 62 having a cylindrical body portion 62a and an outwardly extending flange portion 62b. A cylindrical hub member 64 is centrally disposed, and extending radially as spokes in a wheel between the hub member 64 and the ring member 62 are a number of louvres 66. In the illustrated embodiment there are eight louvres, each identically constructed and comprising a deflecting plate 68 and a rod 70 which extends completely the length of the deflecting plate 68 and has protruding threaded ends 70a and 70b respectively. The outer protruding end 70a of the rod 70 of each louvre extends through an aperture in the cylindrical body portion 62a of the ring and may be locked in place with respect to the ring body portion by means of an inner nut 72 and a pair of outer nuts 74 and 76. Similarly, the inner end 70b of the rod 70 extends inwardly through an aperture in the hub member 64 and may be locked in place by means of an outer nut 78 and a pair of inner nuts 80 and 82. This construction of the louvred deflector assembly 29 permits the louvres 66 to be positioned with their deflecting plates 68 disposed at the desired angle for proper deflection of the stream from the fan blade 32. As illustrated in FIG. 4, these louvres may be adjusted so that each is at a slightly different angle with respect to the vertical. In the embodiment illustrated in FIG. 4, the deflecting plate of one of the louvres is actually parallel to the axis of the ring member 62 and thus parallel to the stream from the fan blade 32; whereas, the remaining louvres are disposed with their deflecting plates at varying angles with respect to the vertical. The angle of adjustment of the deflector plates may vary for each installation and will depend at least to some extent upon the size and shape of the product being treated, the method and degree of loading the smokehouse, and the atmosphere of the smokehouse.

Means is provided for rotating the deflector assembly 56 with respect to both the fan blade 32 and the ceiling 20. This may be done in a number of ways, one of which is illustrated in the drawings and consists of a horizontal drive shaft 84 that is journaled for rotation in the rear wall 16 of the smokehouse and is connected through a gear reducer 86 to a motor 88, both of which are located on the outside of the smokehouse chamber. Keyed to the drive shaft 84 for each circulating unit is a worm or spiral gear 90 which engages a corresponding spiral gear 92 affixed to the peripheral surface of the cylindrical support member 58 of each deflector assembly 29. In the illustrated embodiment there are four spiral or worm gears 90 attached to the drive shaft 84, each in engagement with a respective spiral gear 92 on one of the deflector assemblies of the four circulating units illustrated. Thus, the deflector assembly for each of these four circulating units is driven by the same drive shaft.

The speed at which the deflector assembly 56 is rotated is substantially less than the speed of the fan blade 32. The speed of the fan may, for example, be on the order of about 730 r.p.m. for a 48-in. fan. The louvred deflector assembly, however, is preferably rotated at a substantially lower speed, which for example may be on the order of about 500 r.p.m. for a 48-in. fan.

While in the illustrated embodiment the power drive means for each fan blade 32 and the power drive means for each deflector assembly 29 are separate and independent, it will be apparent that if desired they may be combined. For example, the drive shaft 84 for the deflector assembly 29 may be positioned vertically with a power take-off from the fan motor 48 if desired. If this were done, a separate somewhat shorter drive shaft 84 could be provided for each unit with each such drive shaft extending through a bearing member in the top wall or ceiling 20 of the smokehouse, in much the same manner as the fan shaft 34 extends through the bearing member 36. The gear reducer 86 could then be driven by the motor 48. With this type of an arrangement, the gears 90 and 92 would both be spur gears. Various other modifications are also possible. For example, the fan shaft 34 may actually be an extension of the drive shaft 48a of the motor 48, thereby eliminating the pulleys 50 and 52, and the belt 54.

The apparatus herein disclosed is particularly adapted for practicing the novel method of circulating atmosphere within a smokehouse or other chamber. The method consists of the steps of rotating a fan blade within a chamber to forcibly flow a stream of atmosphere within the chamber in a predetermined direction, and simultaneously rotating a plurality of angularly disposed louvres in the stream at a substantially slower speed of rotation than the fan blade to angularly deflect at least a portion of the stream from the predetermined direction and toward different areas of the chamber.

It is to be understood that the present disclosure has been made only by way of example and that many additional modifications and changes in various details may be resorted to without departing from the invention.

What is claimed is:

1. In combination with a chamber, atmosphere circulation means comprising a bearing member extending through a wall of said chamber; a fan shaft extending through and journaled for rotation in said bearing member; a fan blade affixed to said shaft within said chamber; a deflector assembly comprising a frame journaled for rotation on said bearing member within said chamber and extending forwardly of said fan blade and a plurality of louvres carried by said frame in front of said fan blade; a rotatable drive extending through a wall of said chamber and in driving shaft engagement with said deflector assembly; and power motive means outside of said chamber for driving said fan shaft and said deflector assembly drive shaft, whereby said fan blade may be rotated within said chamber and said deflector assembly may be rotated relative to said fan blade.

2. The apparatus of claim 1 wherein said deflector assembly frame comprises an annular peripheral ring member and an annular central hub member and said louvres extend radially between said hub member and said ring member.

3. The apparatus of claim 2 wherein said louvres are journaled in said hub and ring members for angular adjustment, and means is provided for locking said louvres in the desired position of angular adjustment.

* * * * *